2,906,790

PURIFICATION PROCESS

Rex W. Smyth, Tarentum, Pa., assignor to Gulf Research & Development Company, Pittsburgh, Pa., a corporation of Delaware No Drawing. Application September 12, 1957
Serial No. 683,464

7 Claims. (Cl. 260—677)

This invention relates to a purification process and more particularly to a process for purifying a mixture containing conjugated diolefins and monoolefins.

Hydrocarbon mixtures containing olefins are often contaminated with compounds which interfere with subsequent reactions to which such olefins may be subjected. Thus olefins are often prepared by passing a material such as paraffinic oils, petroleum waxes, etc., through a heated zone under conditions wherein such material is decomposed. While desirable olefins such as n-1-hexene, n-1-heptene, n-1-octene, etc., are prepared in such processes, other unsaturated compounds, which can be undesirable under some circumstances, such as conjugated diolefins, for example, heptadiene, are also formed. When the hydrocarbon mixture is subjected to further reactions, the conjugated diolefins can polymerize, decompose or inhibit such reactions or form unwanted by-products. For example, when the monoolefins obtained are reacted with hydrogen and carbon monoxide to produce aldehydes and, ultimately, alcohols in some cases in accordance with the well-known Oxo process, the reactions are severely inhibited and uncommonly long residence periods are required. Obviously, it is especially desirable, from an economic point of view, to remove such conjugated diolefins from a mixture containing the same and monoolefins prior to subjecting the latter to subsequent reactions.

I have found that a hydrocarbon mixture, particularly a hydrocarbon mixture comprising monoolefins, containing as impurity a conjugated diolefin containing a total of 4 to 28 carbon atoms, can be purified of said conjugated diolefin by subjecting said mixture to hydrogenating conditions at a low temperature and a low pressure in the presence of nickel.

The conjugated diolefin which can effectively be removed by hydrogenation in accordance with my invention is any conjugated diolefin having a total of from 4 to 28 carbon atoms in the molecule. Substituents such as methyl, ethyl, propyl, etc., can also be present on the conjugated diolefin without adversely affecting the hydrogenation reaction and may even enhance the ease of hydrogenation. Examples of conjugated diolefins which can be removed in accordance with the process described and defined herein are hexadiene, heptadiene, octadiene, nonadiene, decadiene, 2 methyl-hexadiene, 3-methyl-heptadiene, isoprene, allo-ocimene, piperylene, 1-phenyl-butadiene, octacosadiene, etc.

The hydrocarbon mixture purified in accordance with the present process is preferably a hydrocarbon mixture containing monoolefins carrying as a contaminant one or more of the conjugated diolefins identified above, such as a hydrocarbon mixture obtained as a result of the thermal cracking of paraffinic oils, petroleum waxes, etc. While the hydrocarbon mixture being purified can contain a relatively large amount of conjugated diolefin as impurity, it is contemplated that the hydrocarbon mixture being purified contains less than about 50 percent by weight based on said mixture of the conjugated diolefin as impurity, preferably from about 0.1 to about 10 percent by weight.

Since the present reaction is essentially a selective hydrogenation reaction, that is, the conjugated diolefin is hydrogenated while the monoolefin associated therewith is not, it is apparent that the hydrogenation catalyst used is extremely important. I have found that excellent results are obtained by using nickel or nickel oxide catalyst. The latter can be used as such or reduced substantially to the pure metal with good results. The amount of catalyst used is at least about 5 percent by weight, based on the mixture being treated, preferably about 10 to about 500 percent by weight.

The temperature at which the present reaction takes place is critical in order to obtain the selective hydrogenation. I have found that the temperature must be at least above about 150° F., preferably about 160° to about 200° F. The partial pressure of hydrogen is similarly critical and must be below about 80 pounds per square inch gauge, preferably from about atmospheric pressure to about 50 pounds per square inch gauge.

The amount of hydrogen necessary is merely that sufficient to hydrogenate the conjugated diolefins present, although an excess of hydrogen is preferred. Generally, at least about one mol of hydrogen, preferably about one to about 500 mols of hydrogen, per mol of conjugated diolefin, is sufficient for the purification reaction. While the space velocity (volume of gas per minute expressed as cubic feet of gas at 0° C. and atmospheric pressure per cubic feet of catalyst) is not critical, it should be at least about 0.1 and preferably about 0.5 to about 2000. The time required for the reaction is also not critical, although it should be long enough for the substantially complete hydrogenation of the conjugated diolefins to occur. In general a period of at least about one-half hour and particularly about one to about 10 hours is sufficient to hydrogenate substantially all of the conjugated diolefin present.

The invention can be further illustrated below in the following examples.

EXAMPLE I 318 cc. of a hydrocarbon mixture containing 92 percent by volume of octene-1 and 5.2 percent by weight of isoprene at atmospheric pressure and 72° F. was heated at selected temperatures in the presence of 103 grams of nickel on alumina, which had been reduced from nickel oxide calculated at 31 percent nickel, and 310 cc. of hydrogen. The runs were conducted with the partial pressure of hydrogen being about 10 pounds per square inch. The results obtained are set forth below in Table I.

Table I

| Lapsed time, hours | Temperature, °F. | Octene, percent by volume | Saturates, percent by volume | Isoprene, percent by weight |
|---|---|---|---|---|
| 2.4 | 130 | 92.0 | 5.4 | 5.1 |
| 3.2 | 140 | 91.9 | 5.7 | 5.0 |
| 4.5 | 150 | 91.4 | 6.1 | 4.4 |
| 5.6 | 160 | 91.7 | 6.1 | 2.9 |
| 6.7 | 160 | 91.5 | 6.0 | 1.2 |
| 7.4 | 170 | 90.8 | 6.5 | 0.3 |
| 7.9 | 170 | 90.1 | 7.3 | <0.01 |

The data in Table I clearly demonstrate the advantages of the present invention. It can be seen that with a temperature of at least 160° F. and a partial pressure of hydrogen of about 10 pounds per square inch the gaseous mixture is substantially completely purified of the isoprene impurity but at the same time octene-1 remains substantially unreacted.

That the pressure is extremely critical in obtaining the desired selective hydrogenation is apparent from the run whose data are summarized below in Table II. The run was similar to that reported above in Table I, except that the partial pressure of hydrogen was increased from about 10 pounds per square inch gauge to 100 pounds per square inch gauge.

Table II

| Lapsed time, hours | Temperature, °F. | Octene, percent by volume | Saturates, percent by volume | Isoprene, percent by weight |
|---|---|---|---|---|
| ½ | 80 | 91.7 | 6.4 | 5.2 |
| 1 | 110 | 90.9 | 6.9 | 5.1 |
| 1½ | 140 | 90.9 | 7.2 | 4.2 |
| 2 | 140 | 83.5 | 15.0 | 0.5 |
| 2½ | 140 | 54.5 | 44.1 | 0.07 |
| 3 | 140 | 22.5 | 76.2 | 0.004 |

It is apparent from Table II that under the conditions of the reaction the amount of isoprene in the treated mixture can be reduced considerably. However, the amount of octene-1 which is hydrogenated at the same time is increased appreciably, for when the amount of isoprene present is but 0.004 percent by weight, the amount of octene-1 is also decreased to 22.5 percent by volume.

Table III below also shows that the pressure is critical. The run reported therein is identical to the previous runs except that the reaction was conducted at a pressure of 1000 pounds per square inch.

Table III

| Lapsed time, hours | Temperature, °F. | Octene, percent by volume | Saturates, percent by volume | Isoprene, percent by weight |
|---|---|---|---|---|
| ½ | 89 | 86.1 | 12.5 | 2.7 |
| 1 | 110 | 54.7 | 44.1 | 0.11 |
| 1½ | 140 | 5.8 | 93.0 | 0.01 |
| 2 | 140 | 1.9 | 96.7 | 0.0 |

The data in Table III further show that at high hydrogen partial pressures the conjugated diene can be removed but that the monoolefin is also hydrogenated.

That the present process is operative to remove other conjugated diolefins is apparent from the following example.

EXAMPLE II 300 cc. of a $C_6$ cut boiling at 47°–79° C. under a pressure of 14.7 pounds per square inch absolute, obtained by cracking a paraffin wax having a melting point of 140° F. at a temperature of 1040° F. and atmospheric pressure, having 86½ percent by volume monoolefins, 10 percent by volume saturated material and 3½ percent by weight diolefins, was treated with 310 cc. of hydrogen in the presence of the same catalyst used in Example I. The partial pressure of hydrogen was maintained at 20 pounds per square inch gauge. The results obtained are tabulated below in Table IV.

Table IV

| Time | Temperature, °F. | Monoolefins, percent by volume | Saturates, percent by volume | Diolefins, percent by weight |
|---|---|---|---|---|
| 1st hour | 160 | 86.6 | 10.4 | 2.3 |
| 2nd hour | 160 | 85.3 | 11.6 | 1.2 |
| 3rd hour | 160 | 83.6 | 13.8 | 0.6 |
| 4th hour | 170 | 78.5 | 18.7 | 0.2 |
| 5th hour | 170 | 74.7 | 22.9 | 0.08 |
| 6th hour | 180 | 69.2 | 28.3 | 0.04 |

The above data clearly show that a satisfactory amount of the conjugated diolefins are removed from the mixture before an appreciable amount of monoolefins are reduced to saturates.

Results similar to the above are obtained when other conjugated diolefins, for example, hexadiene, heptadiene, octadiene, nonadiene, decadiene, 2 - methylhexadiene, 3-methyl-heptadiene, isoprene, allo-ocimene, piperylene, 1-phenylbutadiene, octacosadiene, etc., are present in the mixture being treated in accordance with the process of this invention.

Obviously, many modifications and variations of the invention as hereinabove set forth can be made without departing from the spirit and scope thereof, and therefore only such limitations should be imposed as are indicated in the appended claims.

I claim:

1. A process for purifying a mixture containing a conjugated diolefin having a total of 4 to 28 carbon atoms in the molecule as an impurity which comprises heating such mixture in the presence of hydrogen and a metal catalyst selected from the group consisting of nickel and nickel oxide at a temperature above about 150° F. but below about 200° F. and a hydrogen partial pressure below about 80 pounds per square inch gauge.

2. A process for purifying a mixture containing a conjugated diolefin having a total of 4 to 28 carbon atoms in the molecule as an impurity which comprises heating such mixture in the presence of hydrogen and a metal catalyst selected from the group consisting of nickel and nickel oxide at a temperature of about 160° F. to about 200° F. and a hydrogen partial pressure of about atmospheric pressure to about 50 pounds per square inch gauge.

3. A process for purifying a mixture comprising a monoolefin and containing a conjugated diolefin as an impurity, said conjugated diolefin being present in an amount less than about 50 percent by weight based upon said mixture, which comprises heating said mixture in the presence of hydrogen and a metal catalyst selected from the group consisting of nickel and nickel oxide at a temperature above about 150° F. but below about 200° F. and a hydrogen partial pressure below about 80 pounds per square inch gauge.

4. A process for purifying a mixture comprising a monoolefin and containing a conjugated diolefin as an impurity, said conjugated diolefin being present in an amount from about 0.1 to about 10 percent by weight based upon said mixture, which comprises heating said mixture in the presence of hydrogen and a metal catalyst selected from the group consisting of nickel and nickel oxide at a temperature of about 160° F. to about 200° F. and a hydrogen partial pressure of about atmospheric pressure to about 50 pounds per square inch pressure.

5. A process for purifying a mixture comprising a monoolefin and containing a conjugated diolefin as an impurity, said conjugated diolefin being present in an amount from about 0.1 to about 10 percent by weight based upon said mixture, which comprises heating said mixture in the presence of at least about one mol of hydrogen per mol of conjugated diolefin and a metal catalyst selected from the group consisting of nickel and nickel oxide at a space velocity of at least about 0.1 at a temperature of about 160° F. to about 200° F. and a hydrogen partial pressure of about atmospheric pressure to about 50 pounds per square inch pressure.

6. A process for purifying a mixture comprising a monoolefin and containing isoprene as an impurity which comprises heating said mixture in the presence of hydrogen and a metal catalyst selected from the group consisting of nickel and nickel oxide at a temperature above about 150° F. but below about 200° F. and a hydrogen partial pressure below about 80 pounds per square inch gauge.

7. A process for purifying a mixture comprising octene and containing isoprene as an impurity which comprises heating said mixture in the presence of hydrogen and a metal catalyst selected from the group consisting of nickel and nickel oxide at a temperature above about 150° F. but below about 200° F. and a hydrogen partial pressure below about 80 pounds per square inch gauge.

References Cited in the file of this patent

UNITED STATES PATENTS

| | | |
|---|---|---|
| 1,860,624 | Sauerwein | May 31, 1932 |
| 2,511,453 | Barry | June 13, 1950 |
| 2,542,970 | Jones | Feb. 27, 1951 |
| 2,674,634 | Greensfelder et al. | Apr. 6, 1954 |